Jan. 20, 1948.  J. E. WISS ET AL  2,434,780
PROCESS OF MOLDING HOT MATERIALS
Filed Jan. 29, 1945  2 Sheets-Sheet 1

INVENTORS
John E. Wiss
and Rio B. Wagner
by N. B. Sliozky
Atty.

Jan. 20, 1948.   J. E. WISS ET AL   2,434,780
PROCESS OF MOLDING HOT MATERIALS
Filed Jan. 29, 1945   2 Sheets-Sheet 2

INVENTORS
John E. Wiss
& Rio B. Wagner
by T. B. Sliosz, Atty

Patented Jan. 20, 1948

2,434,780

UNITED STATES PATENT OFFICE 2,434,780

PROCESS OF MOLDING HOT MATERIALS

John E. Wiss and Rio B. Wagner, Columbus, Ohio, assignors to United States Gypsum Company, Chicago, Ill., a corporation of Illinois Application January 29, 1945, Serial No. 575,036

5 Claims. (Cl. 18—58)

This invention pertains to the art of casting and mold making. More specifically it is directed to a process for making and using molds or shapes from plaster of Paris with or without modifying ingredients for use with heated materials.

Plaster of Paris is a very versatile and useful material in the art, casting, modeling and pattern shops. It is low in cost and readily available. Its physical characteristics, working qualities and its ability to form extremely accurate surface reproductions of configurations not only from the pattern but also when used as a mold, make it a most valuable material to the craftsman as well as to industry. Besides its use as a molding material, it is used widely as a pattern making material since it possesses a number of qualities that render it very useful and easily manipulatable by the artisan or craftsman. In addition to its other qualities, its set and rate of hardening can be controlled over wide ranges which permits a craftsman a wide latitude of time in which to perform his operations.

Another desirable quality of plaster of Paris molds is that the strength of the finished mold can be varied widely, in relation to the material which is molded in it. Crushing strength varying from a few ounces per pound up to 10,000 pounds or more per square inch can be obtained in the finished mold. This is a highly desirable asset, particularly in casting metals where expansion and contraction changes occur during the congealing stages and in order to maintain dimensional accuracy, it is desirable that the mold itself or core inserts contained within the congealing material be crushable.

This variation in strength can be accomplished by suitable variation and manipulation of one or more factors having an influence upon strength. Some of these factors are the type, length and manner of mixing and blending the plaster of Paris with the water, atmospheric and temperature conditions, amount and temperature of water used as well as the nature of the impurities present therein, the effect of various additives such as fillers, like asbestos, talc, etc., or set controlling and rate of hardening reagents, conditions at time of casting, and even the type and nature of the calcium sulfate crystal and others.

Though plaster of Paris possesses so many unique and excellent characteristics, its use in a hydrated form in connection with hot materials not only as a basic pattern material but also as a mold material has been greatly restricted.

This restriction in the use of a calcium sulfate hydrate shape as a hot cast receiving medium is based upon some of the physical and chemical characteristics of the hydrated as well as dehydrated forms of calcium sulfate. Calcium sulfate in the dihydrate or even the hemihydrate stages liberates its chemically combined water well under 300° F. Attempts to cast in plaster of Paris molds, hot materials heated near or above the water releasing point, has always caused dangerous explosions due to formation of steam from the liberated water. Besides the danger of injury to the workmen, the casts, if made, were full of blow holes, surface imperfections and in general unfit for commercial use and production. It, therefore, has been highly desirable not only for the sake of safety, but also since a greater degree of success and efficiency was obtained in the final cast, to completely dehydrate plaster of Paris molds when they were used to receive melts of hot materials. As the dehydration of a plaster of Paris mold proceeded under the influence of heat, various stresses and strains were set up within the mold body. Dimensional changes due to such structural strains occurred and the mold therefore became unfit, for it did not faithfully and accurately reproduce the configurations of its impression receiving or active forming surface.

Many processes and techniques of using a calcium sulfate shape in connection with hot casts have been expounded and tried commercially. Some of these have even found commercial acceptance but require laborious and costly compounding, preparation of the shapes, expensive equipment, and tedious techniques. The principal objective of these processes is to provide a permeable or porous body within the calcium sulfate shape so that the gases, steam and other deleterious volatile products can be readily vented to the exterior. Some of these processes involve the addition of such well known expedients as wood fiber and other inflammable or volatile materials that can readily be removed from the body by heat or fire. In performing this operation, it is obvious that the plaster of Paris shape which has been fully hydrated to the dihydrate stage necessarily must be calcined to the anhydrous stage. In the course of such process of calcination, various strains and stresses are set up within the shape and frequently undesirable and detrimental dimensional changes like shrinkage, warpage and others occur. Obviously, as previously mentioned, such a process does not yield a mold that can be used for precision casting.

To overcome these objectionable and detrimental structural changes during dryout, many incorporate various inert strain and stress relieving additives such as ground porous brick dust, infusorial earth, silica, asbestos, talc, pumice, etc., in desirable quantities to compensate or to eliminate such structural dimensional changes. These materials also serve in a very useful capacity of imparting to the mold the desirable characteristics of permeability which during hot molding processes permit gases and other volatiles formed to escape through the mold into the atmosphere. Of course, the mold containing such additives or prepared by the use of excessive amounts of water, in order to provide a permeable body, has to be heated to a rather high degree in order to remove the water of combination or crystallization present in the calcium sulfate dihydrate. The temperature conditions during heating may vary from the water liberation temperature of the calcium sulfate dihydrate to the temperatures at which the various additives may be decomposed or destroyed. Alternately some of these mixtures or compositions may be heated not only to dehydration temperature of the calcium sulfate dihydrate, but also to that temperature which will expand or contract the materials selected to the point where the increased dimensions become normalized and are such that the normal dimensional change of the metals being cast in them can be compensated for. Typical of these are the numerous dental investment plasters.

Another function of the additives used in the prior art in connection with plaster of Paris molds is to control the cubical shrinkage of the plaster of Paris which occurs in the course of dehydration from the dihydrate to the hemihydrate and from the hemihydrate to the anhydrite stages. As the change of the phases progresses throughout the mold, the cubical shrinkage sets up strains and stresses within the mold and causes an inaccurate dimensional facing not only upon the surface of the mold itself but also as to the linear dimensions.

Another factor of somewhat less importance but nevertheless carefully considered in commercial operations are the increased drying costs which are incurred when plaster of Paris molds are dried through the successive stages to a bone dry condition, before they are in the condition suitable to receive hot plastic materials such as metal, Korogel, plastics, rubber, thermo-plastic or thermo-setting resins and materials.

Therefore, it is one among many of the objects of this invention to provide an economical process for using calcium sulfate dihydrate molds directly in contact with hot materials such as metals and various thermo-plastic and thermo-setting substances.

Another object of this invention is to provide a mold which is readily permeable to decomposition products formed at the interface of the mold and the poured material.

A still further object of the invention is to provide a process and means for the controlled chilling and solidification of the congealing substances within the mold.

A still further object is to provide means for the introduction of inert gases into the mold cavity and into the pores of the mold itself to prevent undesirable oxidation and other reactions with the material being cast.

And a still further and additional object of this invention is to remove occluded gases adsorbed and absorbed near or at the interface of the mold and the material poured into the mold thereby permitting an extremely intimate contact between the mold and the material being molded.

These and other objects, variations, modifications and adaptations of this marked and valuable improvement in this art can be readily varied by one skilled in the art without departing from the underlying and basic principles of this invention as fully described hereinbelow not only by numerous examples and a detailed description but also shown and illustrated in the drawings forming a part of this disclosure.

Figure 1:
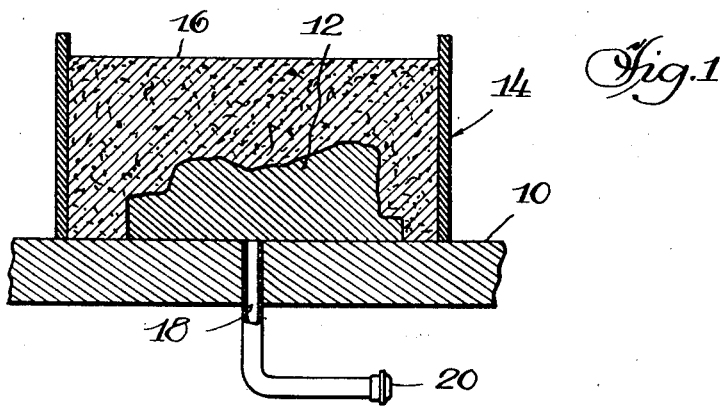
Figure 1 shows a cross section of a simple mold.

To clarify the meaning of the various terms used in this specification it is desirable to define them clearly to prevent confusion. The term "pressure," as used in this specification, is defined in terms of absolute pressure (i. e., atmospheric pressure is 14.5# per sq. in.). Absolute zero, or complete vacuum would be its lowest point. The term "congeal" means to gel, cool, chill, harden, freeze, or change from a liquid or a plastic phase to a stiff immobile form. The term "calcium sulfate hydrate" includes not only calcium sulfate hemihydrate but also calcium sulfate dihydrate. Calcium sulfate hydrate is either the naturally occurring rock that can be carved into the desired shape or that produced by adding sufficient amount of water to commercially available forms of plaster of Paris and allowing the mixture to set and harden under normal conditions into the desired shape. The crystals formed are relatively small, acicular in habit and when tested for permeability under the standards of the American Foundrymen's Association will have a permeability of less than 0.10 units. The term "plastic" means a liquid, semi-liquid, plastic, moldable, hardenable, thermo-plastic or thermo-setting and other materials that can be formed with or without resort to pressures below the crushing strength of the hydrated calcium sulfate mold. Plastic molding materials include glue, gelatine, resins etc., and such flexible materials as Korogel. Korogel is an elastic, thermoplastic plasticised polyvinyl chloride sold by the B. F. Goodrich Company under the trade name of Korogel. The term "active surface" means the actual surface of the mold and/or model which is in contact with the cast material.

In preparing a mold in accordance with the principles underlying this invention, a suitable pattern or shape 12 made from ordinary plaster of Paris in accord with conventional procedure and technique of the casting art, is prepared. This pattern or shape 12, consists essentially of calcium sulfate dihydrate. The shape 12 is placed over an opening 18 through the supporting base 10, which is in turn connected to a venting outlet 20. The latter is preferably connected to a source of vacuum (not shown) or some other means capable of rapidly exhausting the interior of the mold. To facilitate and to assist in quick removal of gases, steam, etc., and other volatiles formed during the process of casting hot materials in a plaster of Paris mold, a cavity 22 (or some similarly functioning means such as a porous ceramic base) is formed within the base of shape 12. A further modification and extension for facilitating the egress of rapidly developed products of decomposition, steam, etc., within the hydrated calcium sulfate shape consists of a series of venting tubes 24. These are disposed as closely as possible to the active surface of the shape so that the gases, steam, etc., developed at the interface between the hot casting material 16 and the hydrated calcium shape 12 are readily and rapidly removable by means of vacuum through the venting port 20. The venting tubes are preferably continuous so that coolants or other temperature modifying and controlling media may be used and exert their influence within close proximity of the cast. Obviously, the number as well as the disposition of the venting tubes will vary not only with the nature of the material being cast, but also in relationship to the size of the cast, design and the characteristics that are desired in the finished cast.

Around the shape 12 is erected wall 14 to provide a means for retaining the cast material 16 about the shape 12. Simultaneously as the casting material 16 is disposed about the shape 12, the formed gases, steam, etc., are vented through the opening 18 by means of a vacuum. This reduced pressure is maintained until the casting material 16, congeals or its temperature is reduced below the decomposition or water liberation point of the hydrated calcium sulfate.

At times (as with Korogel and some thermosetting plastics in sheet form) it may be desirable to exert a positive pressure on the casting material so that any liberated gases can be forced into the hydrated calcium sulfate shape 12. However, in most cases it is desirable to use a reduced or lower pressure within the shape 12 than that outside the casting material 16, so that the flow of the gases, steam, etc., will be through the shape to the venting port 20.

Figure 6:
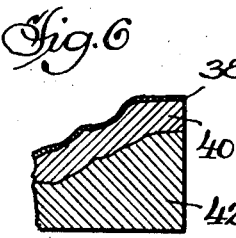
Figure 6 shows a preferred type of a section of plaster of Paris mold wherein different phases of calcium sulfate exist when prepared in accordance with the teachings of this invention. This type of composition is particularly useful in metal casting art.
Figure 2:
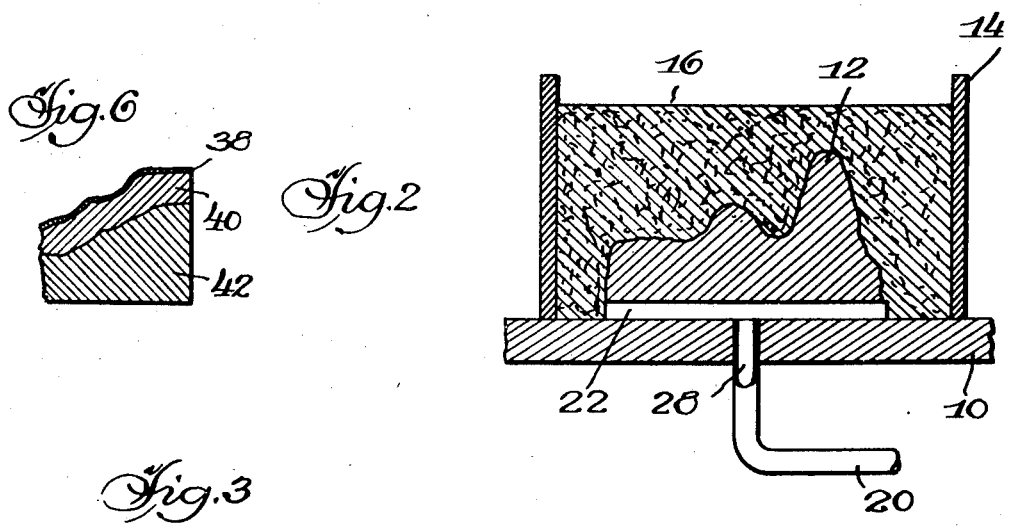
Figure 2 shows a cross section of a mold resting on top of a porous base or an open cavity to facilitate venting of volatiles.
Figure 3:
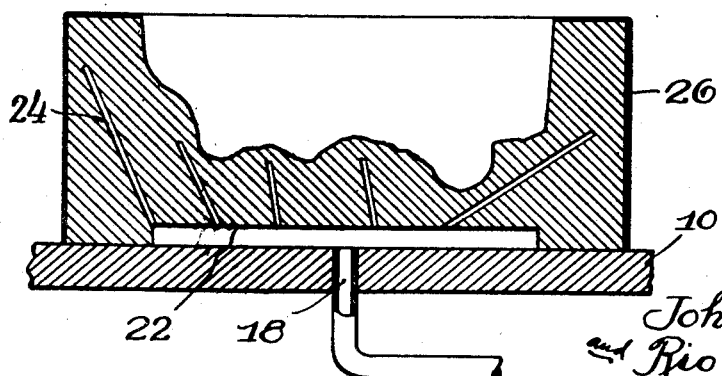
Figure 3 shows a cross section of another modification of a mold resting upon a porous base with a cavity and having scavenger or vent tubes formed in proximity to the interface of the mold.
Figure 4:
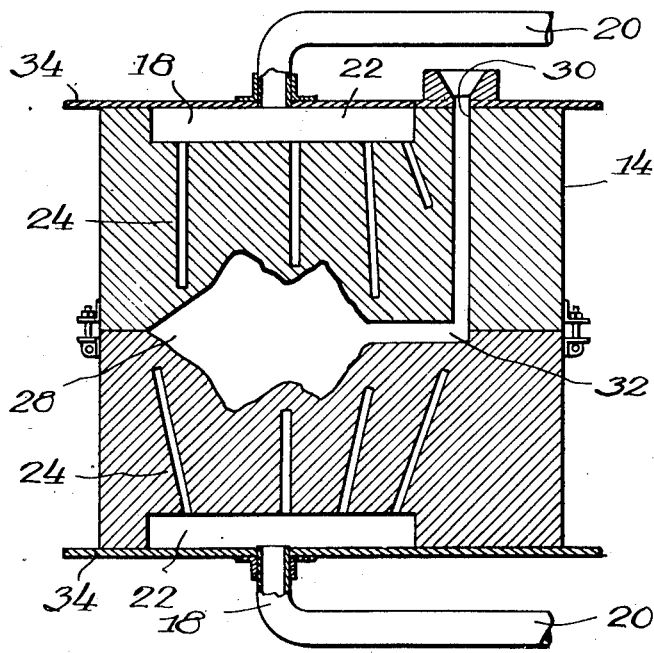
Figure 4 shows a conventional type of a cope and drag mold section where a conventional sprue is shown for feeding material to the interior of the mold and vent tubes from about the cast area are shown leading to the source of vacuum or open port.

In the case of non ferrous metals like bronzes, brasses, aluminum and magnesium alloy, etc., the melting point of these is considerably higher than that of the water liberation point of the hydrated calcium sulfate shape 12. When these plastics are employed then the mold or shape is preferably, but not necessarily, heated to reduce slightly its moisture content. Figure 4 shows a typical, cope and drag mold that may be conveniently used as an illustration of the application of the new and improved technique within the scope of this marked improvement in the art of casting heated plastic materials. Heated air (from any source, not shown) may be sucked in through the sprue hole 30, or in the case of an open cavity mold through the active surface and through the shape 12 for such length of time until the active surface (as defined hereinabove) will have a skin, 38, as shown in detail in Figure 6, of material that is substantially moisture free. A short distance inwardly from the active surface, the character of the composition will change to a phase 40 containing a small amount of chemically combined water. A still further distance 42 away from the active surface, the amount of water either free or chemically combined will be larger and as the distance from the active surface increases, the moisture content increases progressively. When a hot metal like bronze is then poured through the sprue hole 30 into a mold as prepared thereinabove, this initial large outpouring of gases, steam, etc., where the hot plastic metal immediately contacts the active surface of the mold is decreased markedly. Since a reduced pressure is also simultaneously applied during the pouring and maintained until the metal congeals, the gases, steam, etc., formed at the interface of the active surface and the hot metal are removed as quickly as they are formed to prevent formation of bubbles and at the same time provide a very intimate impression and reproduction of the configuration at the active surface of the mold.

Figure 5:
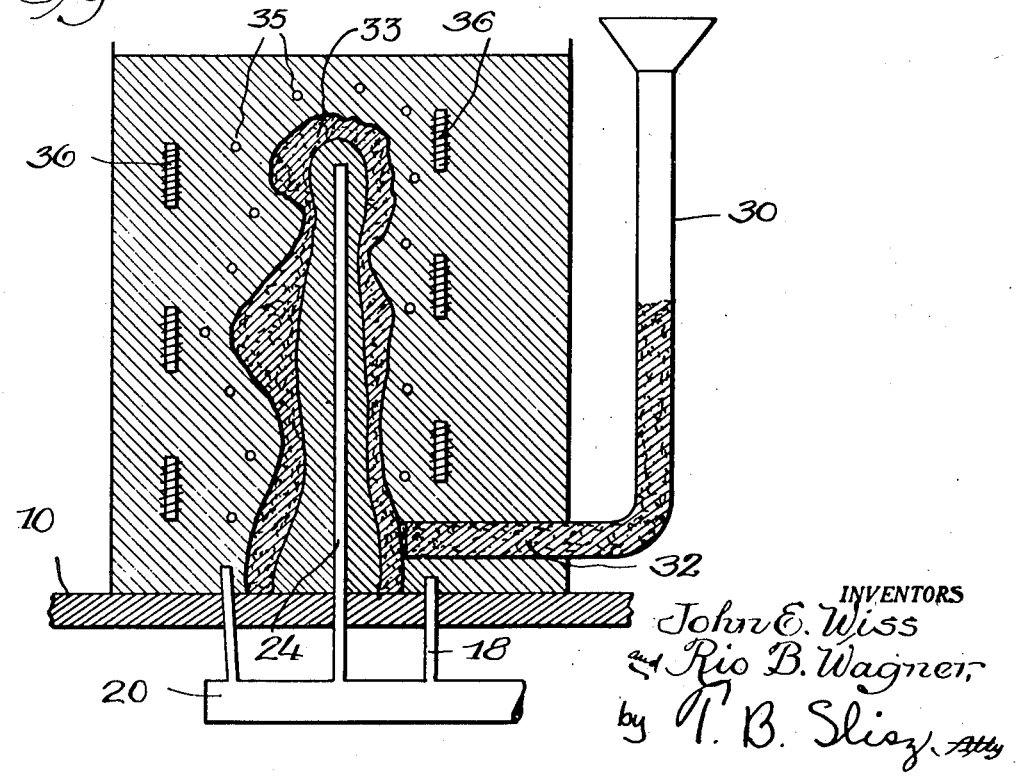
Figure 5 shows a section of a mold and a permeable model upon which a hollow casting is made to a desired thickness in accordance with the principles underlying this invention.

In forming hollow objects or forms such as shown in Figure 5, a tube 24 is inserted within the hydrated calcium sulfate core 33 to assist in drawing up the plastic material, and to remove the pocket of air near the head that impedes the flow of the material into the upper portion of the form. In ordinary foundry practice, risers are utilized to perform a somewhat similar function, but are not always desirable since they provide unnecessary cooling or chilling spaces within the mold. Vent holes 35 connected to the suction outlet 18 assist in removal of any gases etc., formed at the interface. The casting material flows about the core 36 and within the body of the shape 12 from the sprue 30. An excess of casting material is retained in the sprue 30 to provide for shrinkage. In using this improved process there is no need to maintain a "head" of material as practiced conveniently for the suction automatically and uniformly distributes the casting material about the active surface of the shape 12 or the core 33.

The vent holes or continuous venting tube 35 as well as 24 are formed quite conveniently by embedding a rubber tube about the pattern in the plastic plaster of Paris. After the plaster of Paris sets, and is dried, the rubber tube is quite easily withdrawn since it shrinks in cross section when it is pulled out.

At times it may be desirable to exhaust the formed gases through the pores of the permeable mold or shape and use the scavenger tubes 35 or 24 as a convenient means for inserting some type of coolant to reduce rapidly the temperature of the mold and chill the cast. This is particularly true of large sections where as the plastic sets, a shrinkage may occur and voids within the cast body may be formed. To avoid this particular condition, cooling materials such as water, alcohol, carbon tetrachloride, chlorinated hydrocarbons, liquified gases, liquid hydrocarbons etc., are placed in or pumped through the mold. At the same time, while the main body of the cast is being chilled, it is desirable to maintain the excess of the casting material in the sprue 30 in a fluid or plastic condition. If desired, heaters of various types (not shown) may be placed about the sprue 30, or within the body of the mold.

Under some conditions and particularly when the casting material is rather viscous, it may be desirable to heat the mold by means of electrical resistance heaters 36, which will maintain the casting material in a more plastic or fluid condition. Obviously other means of heating, such as induction, high frequency, etc., may be utilized without departing from the spirit of this invention. Once the cavity is completely filled, then the coolant or even a tempering fluid may be circulated through the mold until the casting material has congealed or reached the desired stages.

In case of some alloys, it is desirable to cast them in an inert atmosphere. Before casting metals or materials of this type, an inert gas like carbon dioxide, nitrogen, etc., is allowed to percolate through the pores of the mold, before, during and after the casting operation. The inert gases are allowed to percolate through the mold so long until a safe temperature or condition is reached where the cast material is stable and not affected.

In casting large bodies which require large molds, or when it is desirable to decrease or even eliminate porosity of certain sections and areas of the mold surfaces or of the active surface, an impervious coating 26 may be applied to the desired portion of the surface. This will restrict or even prevent flow of gases, air, etc., adjacent the section about the coated area. It may consist of a solution of a polyvinyl chloride in suitable solvents, certain lacquers, or other suitable coatings impervious to air, can be used.

Another particular advantage of this process, is that accurate and definite control can be maintained during the chilling process. For effective operation, the vacuum should be of such magnitude and velocity that it is capable of removing all the gases, steam, etc. formed during the casting of hot materials. When hot materials are poured into a hydrated calcium sulfate mold that is preferably prepared with an active surface having a layer or "skin" of dehydrated calcium sulfate, the heat immediately begins to exert its influence on the skin of dehydrated calcium sulfate. Since this layer is moisture free and at the same time acts as an insulation, the heat of the hot plastic material is more slowly dissipated through the "skin" layer. When the heat penetrates through the skin layer it begins to act on a partially hydrated section of calcium sulfate. Under the influence of vacuum, the water vaporizes more readily and immediately cools the adjacent area. Thus the heat of decomposition of hydrated calcium sulfate and heat of vaporization of water exert their cooling effect on the sections of the shape adjacent the skin area. By increasing the draw of the vacuum, the water of combination as well as an excess added either as coolant or in the undried mold is removed very rapidly.

Under some conditions where unusually large vacuum capacity is available, the hot materials can be cast directly in wet molds or shapes without any deleterious effects of explosions, blow holes, bubbles, etc.

Essentially this invention comprises the combination of elements consisting of a conventionally prepared and substantially hydrated calcium sulfate shape together with a suitable pressure (or vacuum) means to provide sufficient capacity and ability to remove as quickly as produced, gases, steam and other volatiles from the interface of the hot casting material and the shape through the calcium sulfate body.

Though this invention is described in detail in connection with the illustrations and examples given above, it obviously can be varied considerably, not only as to the materials used in casting but also as to the technique and manipulative sequence that a person skilled in this art, in the light of the detailed disclosure above, can very readily improvise and still be within the ambit of fundamental concepts and scope of the spirit of this invention as defined in the appended claims.

It is claimed:

1. The process of casting and forming fusible materials fusing above the temperature at which hydrates of calcium sulfate lose water of hydration comprising fusing the materials to be cast, placing the fused materials in contact with a desired shape consisting of hydrated calcium sulfate, applying vacuum on said fused material through the body of said hydrated calcium sulfate shape, and maintaining said vacuum until the fused material congeals.

2. In the process of claim 1 wherein the said vacuum is applied until the said fused material cools to a temperature below which the hydrates of said calcium sulfate comprising the said shape lose their water of hydration.

3. The process of forming flexible bodies from plasticized polyvinyl chloride comprising the steps of fusing the said plasticized polyvinyl chloride above the temperature at which hydrates of calcium sulfate lose water of hydration, placing the said fused plasticized polyvinyl chloride in contact with a desired shape formed from hydrated calcium sulfate, applying vacuum on said fused plasticized polyvinyl chloride through the body of said hydrated calcium sulfate shape, and maintaining said vacuum until the said polyvinyl chloride congeals.

4. The process of forming bodies from molten metal comprising the steps of fusing the metal above the temperature at which hydrates of calcium sulfate lose water of hydration, placing the said fused metal in contact with a desired shape formed from hydrated calcium sulfate, applying vacuum on said fused metal through the body of said hydrated calcium sulfate shape and maintaining said vacuum until the fused metal congeals.

5. In the process of claim 1, wherein the said hydrated calcium sulfate shape has continuous passages therethrough and an extraneous coolant is circulated through said continuous passages during the application of vacuum through said shape.

JOHN E. WISS.
RIO B. WAGNER.

REFERENCES CITED

The following references are of record in the file of this patent:

UNITED STATES PATENTS

| Number | Name | Date |
| --- | --- | --- |
| 1,592,536 | O'Neill | July 13, 1926 |
| 1,644,543 | Richmond | Oct. 4, 1927 |
| 1,659,638 | Shapiro | Feb. 21, 1928 |
| 1,992,230 | Meckl | Feb. 26, 1935 |
| 2,205,650 | Hagemeyer | June 25, 1940 |
| 2,161,281 | Carter | June 6, 1939 |
| 2,220,703 | Bean | Nov. 5, 1940 |
| 2,314,378 | Van Rossen | Mar. 23, 1943 |